Feb. 20, 1951 — J. E. MASON ET AL — 2,542,041
FLUID TREATMENT APPARATUS
Filed Oct. 22, 1943 — 2 Sheets-Sheet 1

JOHN E. MASON AND C. ELIASON
INVENTOR.
BY H. A. McGrew
ATTORNEY

Feb. 20, 1951 J. E. MASON ET AL 2,542,041
FLUID TREATMENT APPARATUS
Filed Oct. 22, 1943 2 Sheets-Sheet 2

JOHN E. MASON AND C. ELIASON
INVENTOR.

BY
ATTORNEY

Patented Feb. 20, 1951

2,542,041

UNITED STATES PATENT OFFICE 2,542,041

FLUID TREATMENT APPARATUS

John E. Mason and Clarence Eliason, Denver, Colo., assignors to The Stearns-Roger Manufacturing Company, Denver, Colo., a corporation of Colorado Application October 22, 1943, Serial No. 507,246

3 Claims. (Cl. 159—3)

This invention relates to fluid treatment apparatus, and more particularly to an improved spray device and an entrainment device for removing entrained foam or liquid from vapors or the like, which devices are preferably used in conjunction with each other to improve the effectiveness of the apparatus. Examples of fluid treatment apparatus to which this invention may be applied are evaporators, vacuum pans and the like, utilized in concentrating or removing fluid or vapor from another fluid or solution. The spray device of this invention is especially useful in apparatus for treating sugar solutions or massecuite, or other fluids which contain ingredients tending to adhere to or solidify on surfaces within the apparatus, and therefore must be removed periodically.

In evaporators utilized in sugar mills, for instance, as much moisture or vapor as possible is driven off, so that when the solution or syrup is introduced into the vacuum pan and further amounts of moisture are driven off, crystals of sugar will form readily. Normally, droplets of the sugar syrup or solution, as well as foam resulting from the boiling operation in the evaporator, are carried by the vapors driven off. To recover these entrained ingredients, baffle arrangements for causing the vapors to traverse a circuitous path have been utilized, such baffle arrangements comprising a plurality of concentric tubes or pipes, one tube having an open upper end and the next surrounding tube having an open lower end. However, such baffle arrangements have been difficult to clean, have produced undue pressure drops, and have not caused the vapors to travel a sufficient distance to effect the desired separation.

Among the objects of this invention are to provide improvements in fluid treatment apparatus; to provide an improved and more effective entrainment device for removing ingredients entrained in vapor or fluid produced during a fluid treatment; to provide such a device in which there is easier access for cleaning purposes; to provide such a device in which there is a more effective transfer of removed foam or liquid to a liquid outlet; to provide an improved spray device for use in fluid treatment apparatus; to provide such a device which requires the use of less cleansing liquid; and to provide an improved spray device and improved entrainment device which can be placed together on the same apparatus with a minimum of interference with each other. Other objects and novel features of the invention will become apparent from the general description which follows.

In accordance with this invention, an entrainment device and a spray device are made so that the spray device will extend through the entrainment device but will be spaced from the entrainment device so as to present little or no interference with the free flow of vapors passing into and through the entrainment device. The spray device preferably includes a rotatable supply tube extending through the top of the shell of the evaporator or vacuum pan, and downwardly along the axis of the shell to a point below the entrainment device, which preferably occupies the top of the shell. At its lower end, the supply tube is provided with orifices, such as by a plurality of nozzles, for discharging jets of cleansing fluid against limited portions of the surfaces to be cleansed. Flat spray nozzles, with orifices disposed in a vertical position, are preferably utilized, so that a relatively large surface area can be covered by each spray. The nozzles are preferably disposed at different radial positions and also so that the complete surface area against which one spray jet is directed during rotation of the supply tube overlaps (in some instances to a considerable extent) the complete surface area against which the jet from another nozzle is discharged during rotation of the supply tube.

An entrainment device constructed in accordance with this invention may comprise a plurality of substantially concentric baffles and a partition connecting the lower ends of the baffles and the shell. Each baffle preferably is spaced a sufficient distance from the next baffle to provide a relatively wide passage, and extends from the partition to the upper end of the shell. A side opening in each baffle permits the vapor to follow a path around between the baffles, the side opening in one baffle preferably being opposite the opening in the next adjacent baffle. The shell is provided with a liquid outlet and a vapor outlet and the partition slopes in a direction so that the foam and liquid removed from the moisture will flow naturally to the liquid outlet.

In addition, inwardly extending ledges are provided at the side openings in the baffles and also around the vapor outlet, so that vapor passing through these apertures will tend to be stripped of more entrained liquid or foam and the removed ingredients will be led down to the partition or the liquid outlet.

Further details and features of this invention will become apparent from a more detailed description which follows, taken in connection with the accompanying drawings, in which.

Figures 1, 2:
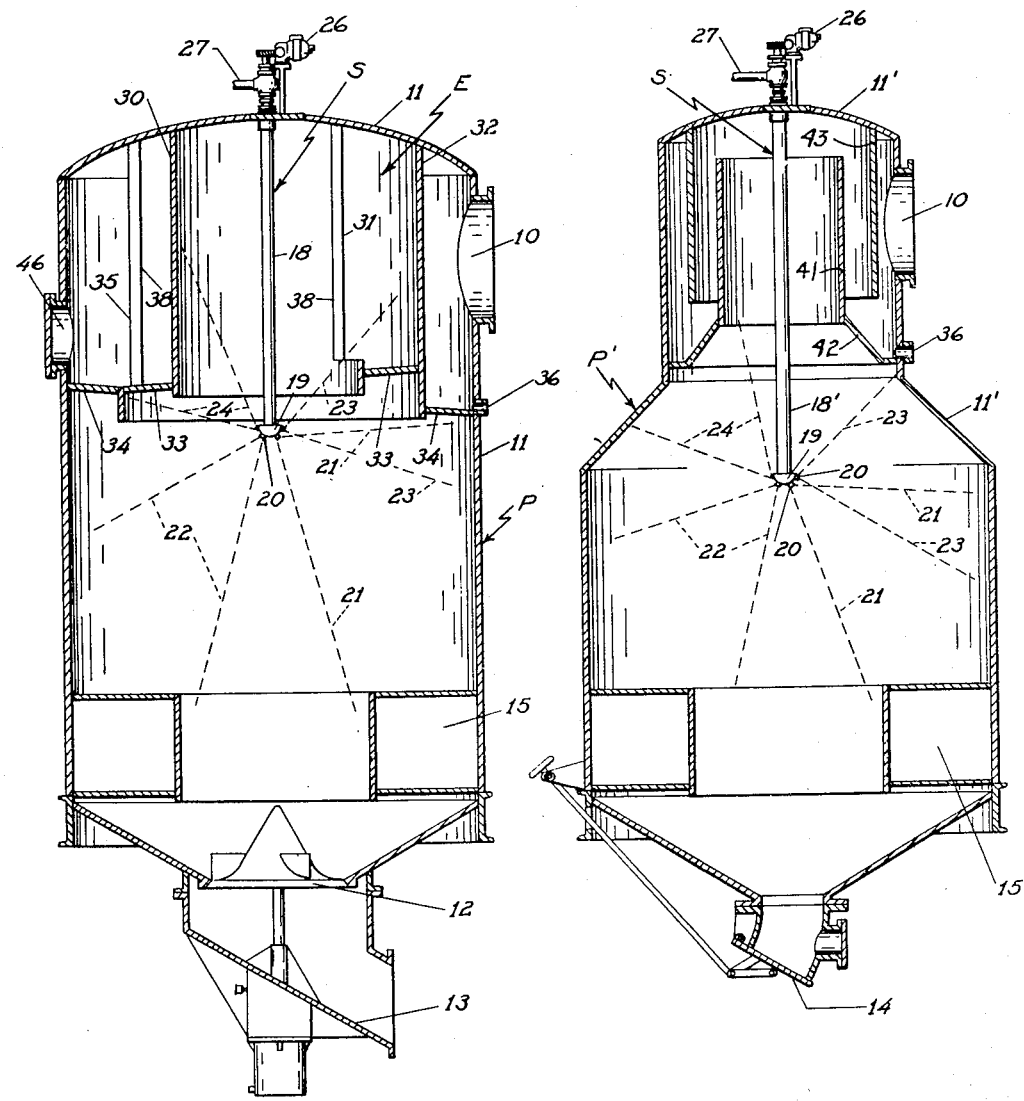
Fig. 1 is a vertical cross section of a Calandria vacuum pan, provided with a spray device and an entrainment device, each constructed in accordance with this invention.
Fig. 2 is a vertical cross section of a Calandria vacuum pan provided with a slightly different type of outlet valve and with a conventional entrainment device, but provided with a spray device constructed in accordance with this invention.

As illustrated in Fig. 1, this invention may be applied to a vacuum pan P, by equipping the same with a spray device S and an entrainment device E, each constructed in accordance with this invention. The vacuum pan P may be of any suitable type, and as illustrated is of a type utilized in producing sugar crystals from the rather thick, heavy syrup or massecuite produced in evaporators as a previous step in sugar refining. The syrup is introduced into the vacuum pan in the conventional manner, as through an inlet pipe (not shown), and a vacuum drawn in a suitable manner, as through a vapor outlet 10 in the upper portion of shell 11. As soon as the batch of syrup in the pan has lost sufficient moisture and the pressure has been sufficiently reduced, crystallization may be started, as by a "shock" treatment, which consists in introducing a small amount of sugar crystals into the mass within the pan. The introduced sugar crystals act as a nucleus, as it were, for the formation of more crystals, and crystallization spreads through the entire mass. When crystallization is sufficiently complete, the mass is discharged through a foot valve 12 into a chute 13, from which it flows to other apparatus for further processing. The foot valve of the vacuum pan P of Fig. 1 is of a pneumatically operated type, although other foot valves may be used, such as the foot valve 14 of the vacuum pan P' of Fig. 2, which valve is of a hand operated type.

Figures 3, 4:
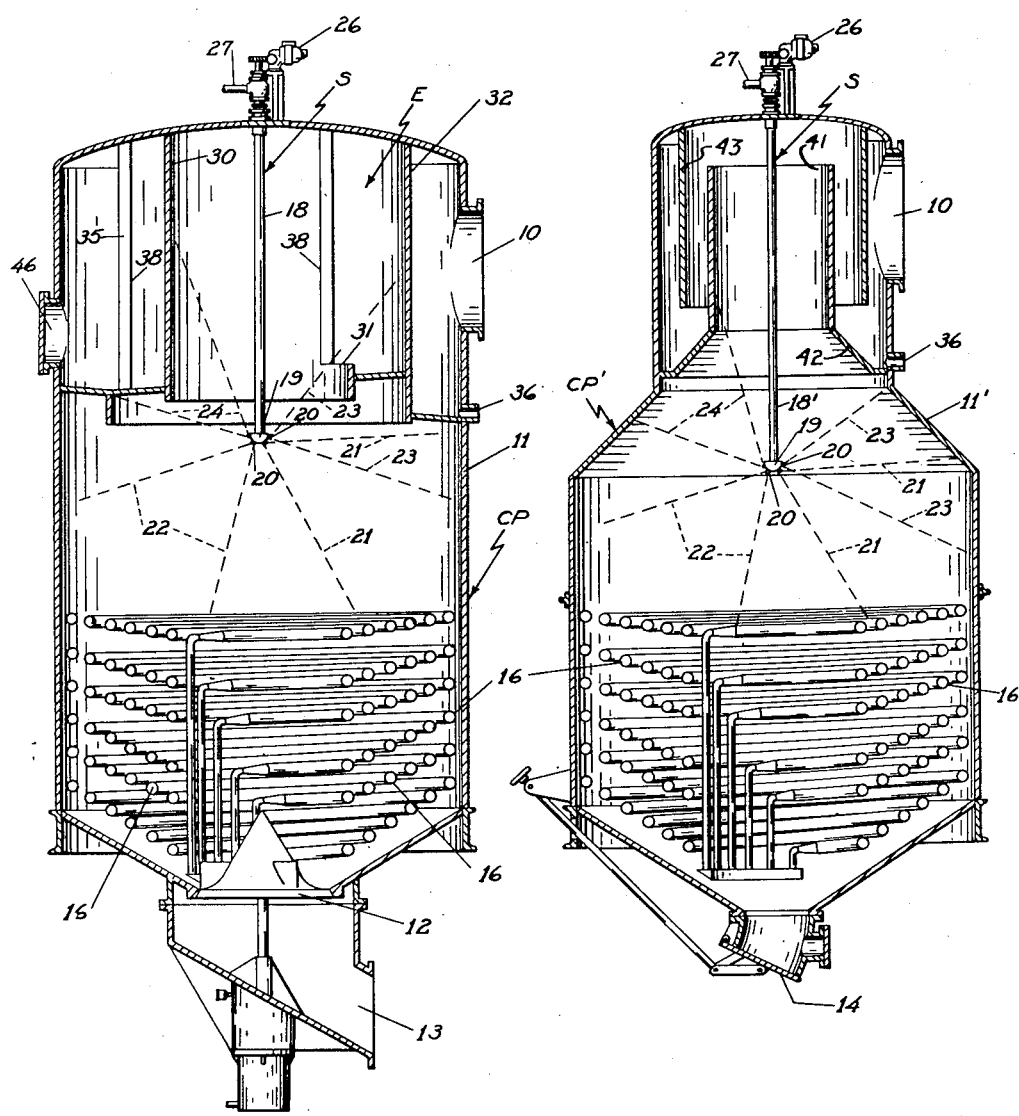
Fig. 3 is a vertical cross section of a coil vacuum pan provided with a spray device and an entrainment device, each constructed in accordance with this invention.
Fig. 4 is a vertical cross section of a coil vacuum pan provided with a slightly different type of foot valve and with a conventional entrainment device, but with a spray device constructed in accordance with this invention.

Heat for the treatment in the vacuum pan, if desired, may be supplied by passing steam or any other suitable heating medium through a circular manifold 15 in the lower portion of the shell, but other methods of heating the mass within the pan may be utilized, such as by passing steam or the like through coils 16 of the coil vacuum pan CP of Fig. 3. (The apparatus of Fig. 3 is similar to the apparatus of Fig. 1 except in the provision for heating.)

The spray device S constructed in accordance with this invention, may comprise in general a supply tube 18 extending downwardly from the top of shell 10 and along the axis thereof and provided at its lower end with a manifold 19 to which a plurality of nozzles 20 are attached. As mentioned previously, the nozzles preferably discharge a relatively flat spray disposed substantially in a vertical plane, and the subtended angle of discharge of each nozzle is such that the area covered by one nozzle will overlap the area covered by one or more other nozzles. For instance, one of the nozzles may discharge a flat vertical spray bounded by the dotted lines 21—21, while another nozzle may discharge a flat vertical spray bounded by the dotted lines 22—22, another nozzle a spray bounded by the dotted lines 23—23, and still another nozzle a spray bounded by the dotted lines 24—24. To discharge such sprays, the nozzles may be disposed at different angles to the axis of rotation of the supply tube. For instance, one nozzle may be disposed at an angle of 75° with respect to the axis of the supply tube (or 15° below the horizontal), another at 60°, another at 90° or on a horizontal line, and still another at 45°. Of course, if there is a tendency for a greater amount of material to be accumulated upon certain surfaces, a greater concentration of spray may be directed thereon. Also, if different nozzles are used so that the subtended angle of the side of one or more sprays is different, then the angular spacing of the nozzles may be varied. Obviously, a greater or lesser number of nozzles may be utilized, if desired, but, as will be evident, the nozzles are so disposed that the surface areas to be cleansed are effectively covered by the jets as the supply tube 18 is rotated.

For pressure equalization in flow from the manifold, the nozzles may be disposed equi-angularly about the periphery of the manifold, such as 90° apart in the case of four nozzles. Also, the supply tube may be rotated through suitable gearing driven by a motor 26 and receive cleansing fluid through an inlet line 27. Further features of the spray device will be brought out later in connection with the description of Figs. 8 and 9.

The entrainment device E, constructed in accordance with this invention, may comprise a cylindrical inner baffle 30, disposed in a vertical position and having an opening 31 in one side thereof. Baffle 30 and an outer baffle 32 are concentric with shell 11 and supply tube 18, which extends centrally of the inner baffle in a position to cause the least interference with the flow of vapor into baffle 30, and less interference than a circular spray pipe.

A partition connects the lower ends of the baffles and the interior of the shell, to complete a circuitous horizontal path for the vapors. The partition comprises plates 33 and 34, plate 33 joining the two baffles, and plate 34 joining the outer baffle and the shell. Plate 33 slopes from right to left, so as to convey liquid from adjacent opening 31 in baffle 30 to an opening 35 in baffle 32, spaced from and preferably directly opposite opening 31. Plate 34 may slope from left to right, to convey liquid from opening 35 to a liquid outlet 36 of shell 11. As will be evident, the partition conveys foam and entrained liquid removed from the vapor during passage through the device directly to liquid outlet 36, without causing any of the removed foam or liquid to drip down across the path of outgoing vapor. It will be understood, of course, that if one or more of the baffles is eccentric, more or less, instead of concentric with the shell, operation of the appaartus normally will not be affected seriously.

As illustrated in Figs. 1 and 3, an inwardly extending ledge 38 is provided along the edge of each opening 31 and 35, to further enhance the removal of entrained foam or liquid. Also, each ledge provides a convenient path for the removed foam or liquid to flow downwardly, either back into the path, or onto the partition.

The vacuum pan P' illustrated in Fig. 2, in addition to being provided with a manually operated foot valve 14 instead of an hydraulically operated one, and the coil vacuum pan CP' of Fig. 4, which is similar to the vacuum pan P' of Fig. 2, but utilizes coils 16 for heating instead of manifold 15, are provided with a more conventional entrainment device. (When such apparatus is provided with a spray device constructed in accordance with this invention, including a supply tube 18', as shown, it may, in certain instances, prove sufficiently satisfactory to render a change to an improved entrainment device uneconomical.)

The previous type of entrainment device comprises an inner tubular baffle 41 extending upwardly from a conical partition 42 and terminating at a point spaced from the upper end of shell 11'. A second tubular baffle 43 surrounds baffle 41 and extends downwardly from the upper end of the shell, so that vapor passes upwardly through baffle 41, down and between baffles 41 and 43, and then upwardly around baffle 43 to a vapor outlet 44. Removed foam and liquid which has been deposited on the surfaces of the baffles will flow to the top side of partition 42, to be conveyed to a liquid outlet 45. As will be evident, liquid which is deposited on baffle 43 will, in dripping off the lower end thereof, flow directly across the path of vapor and will tend to become re-entrained.

It is to be noted that shell 11' of Fig. 2 is smaller at the top, in the region of the entrainment device, whereas the shell 11 of Fig. 1 has substantially the same diameter to its top. One reason for the former is that the space between the baffles is necessarily rather narrow to prevent a relatively straight flow of the vapors from the top of baffle 41 to outlet 44. As a result, the path of travel of the vapors is necessarily rather short. Not only is an undue pressure drop produced, but other disadvantages accrue. For instance, access to the outer surface of baffle 41 and the inner surface of baffle 43 is difficult, and adequate cleaning is a considerable problem. Without adequate cleaning, deposited matter, rust, and the like tend to accumulate and impede the efficiency of the operation, as well as possibly contaminating the liquid deposited on the baffles, which normally contains a constituent to be recovered.

As distinguished from the entrainment device formerly used, the entrainment device constructed in accordance with this invention provides a relatively long horizontal path of travel for the vapor and relatively wide passages, with the result that the resistance to flow of the vapor is decreased and the pressure drop through the device is less. In addition, the ledges 38 and 39 assist materially in removing entrained foam or liquid.

Furthermore, such an entrainment device is more readily cleaned, since a manhole 46, as in Figs. 1 and 3, provided in shell 11 opposite opening 35 in outer baffle 32, permits access to both the outside of the inner baffle and the inside of the outer baffle, as well as to the surfaces surrounding the space between the outer baffle and the shell. The relatively wide space between the baffles and the shell permits cleaning to be done more readily. Thus, not only is the entrainment device of this invention an improvement over the prior device in operation, but also in ease of maintenance.

A further advantage of the entrainment device of this invention lies in the fact that it reduces the overall height of the apparatus, since the entrainment device is capable of utilizing the full diameter of the shell. Also the vapor outlet may be placed in a lower position, as will be evident from a comparison of Figs. 1 and 2 or Figs. 3 and 4. This results in a reduction in the headroom necessary for installing the condensing apparatus and piping.

By automatically controlling the time during which cleansing liquid is sprayed against the surfaces to be cleansed, a considerable reduction in the amount of liquid can be obtained, since it is not left for the operator to determine how long the spray should be left on. This is particularly advantageous when cleansing is carried out at predetermined intervals, even during cycles of operation. By directing the sprays of cleansing fluid against limited portions of the surfaces to be cleansed and rotating or otherwise effecting a relative movement between the sprays and the surfaces, to cover the entire predetermined area, not only is there assurance that all of the surfaces to be cleansed will be sprayed, but, a lesser amount of cleansing liquid can be used, since it is used more effectively.

In addition, there is a cooperation between the entrainment device and the spray device, in that the spray device of this invention tends to flush the floor and clean the inner surfaces of the entrainment device reached through opening 31.

From the foregoing, it will be apparent that this invention provides valuable improvements in fluid treatment apparatus, and more particularly in apparatus wherein vapors or the like are removed from a fluid or liquid, and the problems resulting from the entrainment of foam or liquid in the vapor as well as the deposition of liquid on the surfaces within the treatment shell, must be met.

Although the spray and entrainment devices of this invention may be utilized separately, it is to be understood that they are preferably used in conjunction with each other to enhance the results of the treatment. It will also be understood that, although specific forms of a spray device and an entrainment device constructed in accordance with this invention have been illustrated and described in detail, various changes may be made therein without departing from the spirit and scope of this invention.

What is claimed is:

1. In an evaporating vessel of the upright type that is normally closed and has its interior divided by a series of vertically-ranging partitioning members into a plurality of annular zones through which matter is circulated under pressure in each evaporating cycle of the vessel, the improvement which comprises a supply conduit of relatively small diameter journaled for rotation in an upper wall of the vessel and extending centrally through the upper portion of the vessel to a point of discharge substantially midway of the vertical extent of said vessel, a manifold carried by said supply conduit at its lower end for conjoint rotation and providing a single focal point for wash liquid distribution, a series of nozzles disposed at intervals about the periphery of the manifold, each nozzle having a discharge outlet for wash liquid arranged to direct the discharge in a spray in a substantially vertical plane inclusive of at least one horizontal, one upward and one downward spray, so as to provide a composite vertical spray pattern extending through 360° and directed against substantially all surfaces of the interior structure of the vessel, supply means for delivering a wash liquid into the rotary conduit exteriorly of the vessel, and driving means for said conduit exteriorly of the vessel for rotating the conduit and its manifold during each spraying cycle.

2. In an evaporating vessel of the upright type that is normally closed and has its interior divided by a series of vertically-ranging partitioning members into a plurality of annular zones through which matter is circulated under pressure in each evaporating cycle of the vessel, the improvement which comprises a supply conduit of relatively small diameter journaled for rotation in an upper wall of the vessel and extending centrally through the upper portion of the vessel to a point of discharge substantially midway of the vertical extent of said vessel, a manifold carried by said supply conduit at its lower end for conjoint rotation and providing a single focal point for wash liquid distribution, a series of nozzles disposed at 90° intervals about the periphery of the manifold, each nozzle having a discharge outlet for wash liquid arranged to direct the discharge in a spray in a substantially vertical plane inclusive of at least one horizontal, one upward and one downward spray, so as to provide a composite vertical spray pattern extending through 360° and directed against substantially all surfaces of the interior structure of the vessel, supply means for delivering a wash liquid into the rotary conduit exteriorly of the vessel, and driving means for said conduit exteriorly of the vessel for rotating the conduit and its manifold during each spraying cycle.

3. An evaporating vessel of the character described in claim 2 wherein nozzles are provided intermediate said nozzles which are disposed at 90° intervals about the periphery of the manifold.

JOHN E. MASON.
CLARENCE ELIASON.

REFERENCES CITED

The following references are of record in the file of this patent:

UNITED STATES PATENTS

| Number | Name | Date |
|---|---|---|
| Re. 19,374 | Butterworth | Nov. 20, 1934 |
| Re. 20,976 | McFadden | Jan. 10, 1939 |
| 1,033,580 | Hall et al. | July 23, 1912 |
| 1,071,069 | Marx | Aug. 26, 1913 |
| 1,134,633 | Noll et al. | Apr. 6, 1915 |
| 1,246,556 | Crow | Nov. 13, 1917 |
| 1,624,865 | Freel | Apr. 12, 1927 |
| 1,629,486 | Dougherty | May 24, 1927 |
| 1,806,740 | Butterworth | May 26, 1931 |
| 1,858,842 | Ray et al. | May 17, 1932 |
| 1,905,263 | Burner | Apr. 25, 1933 |
| 2,143,191 | Fletcher et al. | Jan. 10, 1939 |
| 2,208,813 | Ostling et al. | July 23, 1940 |
| 2,328,256 | Breckenridge | Aug. 31, 1943 |
| 2,333,333 | Peebles et al. | Nov. 2, 1943 |
| 2,361,940 | Hall | Nov 7, 1944 |

FOREIGN PATENTS

| Number | Country | Date |
|---|---|---|
| 335,911 | Great Britain | Sept 30, 1930 |